United States Patent

Stelman

[11] Patent Number: 5,308,366
[45] Date of Patent: May 3, 1994

[54] HOT HYDROGEN PRODUCTION APPARATUS

[75] Inventor: David Stelman, West Hills, Calif.

[73] Assignee: Rockwell Internationbal Corporation, Seal Beach, Calif.

[21] Appl. No.: 973,455

[22] Filed: Nov. 9, 1992

[51] Int. Cl.[5] .................................................. B01J 7/00
[52] U.S. Cl. .................................. 48/61; 48/86 R; 48/190; 60/39.464; 422/232
[58] Field of Search ............... 60/39.464; 423/648.1, 423/658.3; 48/61, 190, 86 R; 422/232, 233, 228, 207

[56] References Cited

U.S. PATENT DOCUMENTS

| | | | |
|---|---|---|---|
| 1,955,328 | 4/1934 | Frey | 423/658.3 |
| 2,032,925 | 3/1936 | Ferguson | 423/658.3 |
| 2,375,500 | 5/1945 | Silver et al. | 48/190 |
| 3,050,374 | 8/1962 | Burt et al. | 422/232 |
| 3,085,865 | 4/1963 | Long et al. | 422/232 |
| 3,271,951 | 9/1966 | Nettel | 60/39.464 |
| 3,932,600 | 1/1976 | Gutbier et al. | 422/232 |
| 3,982,910 | 9/1976 | Houseman et al. | 48/61 |
| 4,343,624 | 8/1982 | Belke et al. | 48/61 |
| 4,469,487 | 9/1984 | Peters et al. | 48/86 R |
| 4,755,190 | 7/1988 | Harris | 48/61 |

*Primary Examiner*—Peter Kratz
*Attorney, Agent, or Firm*—H. Fredrick Hamann; Harry B. Field; David C. Faulkner

[57] ABSTRACT

A reactor for producing hot hydrogen in vacuo which in turn drives a power-generating device such as a turbine is disclosed. Within the reactor are injected heat-generating reactants such as beryllium and oxygen. The reactants heat hydrogen which in turn is delivered to a power-generating device such as a turbine.

1 Claim, 1 Drawing Sheet

HOT HYDROGEN PRODUCTION APPARATUS

BACKGROUND OF THE INVENTION

With the advent of a space station with long-term human occupation as well as prospective extended duration spacecraft missions, the need for a simple and reliable yet powerful source of energy for consumption by a space station or spacecraft has been recognized.

Current energy sources employed to power existing space vehicles of the aforementioned variety include solar-powered apparatus as well as nuclear energy devices, all of which may be inherently hampered by insufficient energy production or dangers associated with radiation generated by the nuclear reactor assembly.

Accordingly, it would be desirable to have available a device or apparatus for generating a clean, product which would find utility in powering a device, which device could provide necessary power in a space vehicle.

It is an object of the present invention to generate hot hydrogen to run a power-generating device.

Another object of the present invention is a method of generating hot hydrogen in a reactor vessel utilizing a safe and efficient chemical reaction.

Additional objects, advantages and novel features of the invention will be set forth in the description which follows.

SUMMARY OF THE INVENTION

To achieve the foregoing and other objects, and in accordance with the purposes of the present invention, an apparatus for generating hot hydrogen and a method for utilizing hot hydrogen to operate a power generator is provided. The apparatus of the present invention comprises a reactor into which is introduced heat-producing reactants and hydrogen. Under controlled reaction parameters, the heat-producing reactants undergo a chemical reaction resulting in the production of hot hydrogen.

Associated with the reactor is a filter to which the reaction byproduct and hot hydrogen, are charged. In the filter, hydrogen is separated and released to a power-generating device such as a turbine.

BRIEF DESCRIPTION OF THE DRAWING

FIG. 1 is a schematic representation of an apparatus of the present invention for producing hot hydrogen to power a turbine or the like.

DETAILED DESCRIPTION OF THE INVENTION

Figure 1:
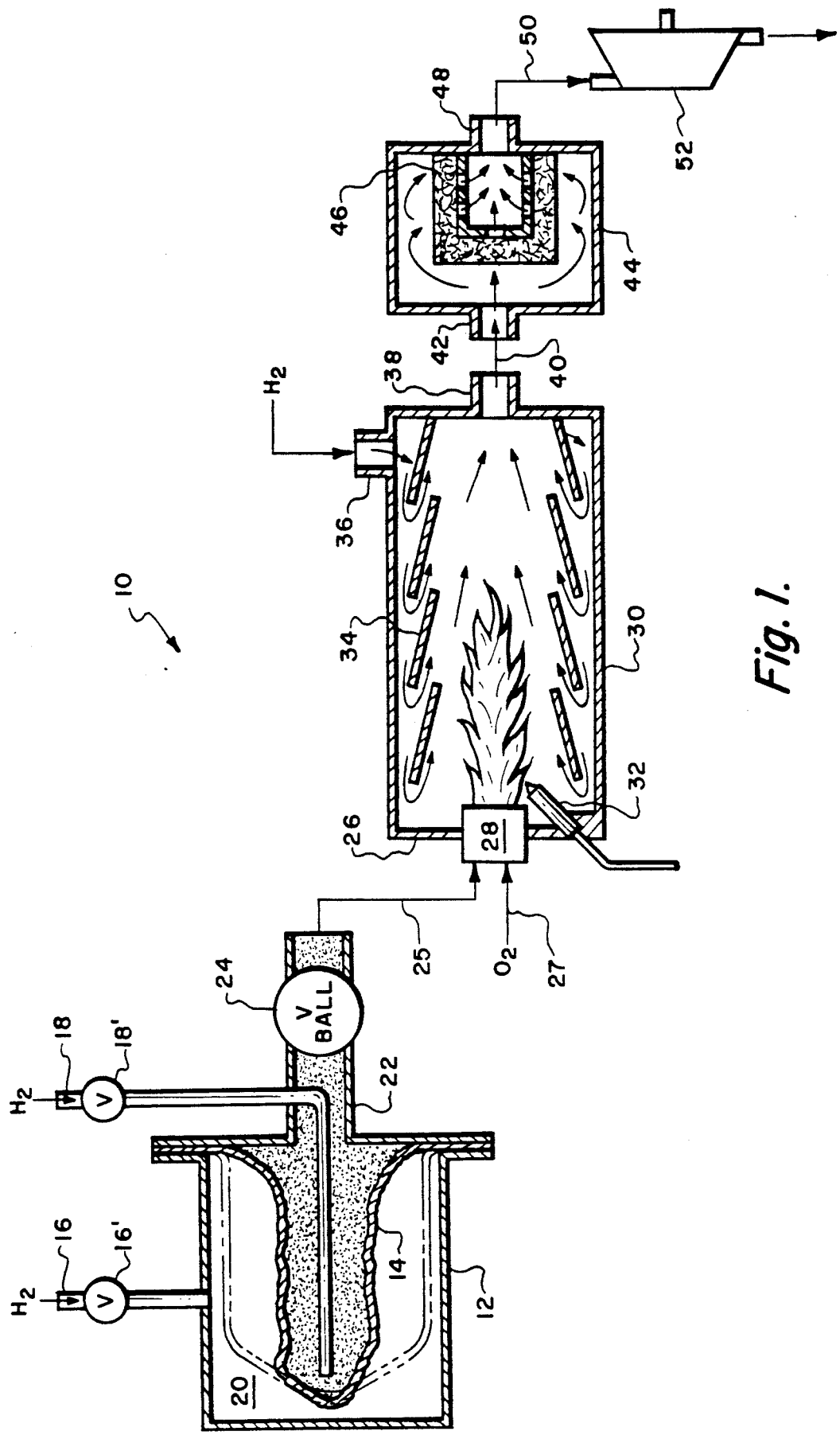

As shown in the FIGURE, apparatus 10 comprises a reactant housing 12 having a collapsible reactant holding container 14 located therein which container holds beryllium powder as indicated by the shading. Reactant housing 12 is provided with fluid conduits 16,18, one of which (16) having valve 16' communicates with the interior 20 of housing 12 and a second (18) having valve 18' which communicates via a pipe 22 of housing 12 with the interior of container 14. One end of pipe 22, fitted with ball valve 24, communicates via conduit 25 to injector 28 in wall 26 of reactor 30 for the introduction of beryllium into injector 28. Positioned adjacent pipe 22 is an ignitor 32 for igniting reactants as same are introduced into the reactor 30. Oxygen, as a second reactant, is conveyed by conduit 27 to reactor 30 which it combines at injector 28 with the beryllium powder for reaction in reactor 30.

About the circumference of the reactor 30, baffles 34 are positioned along the interior walls of the reactor. This will allow for cooling of the reactor during the interaction of beryllium and oxygen by the introduction of hydrogen at opening 36. As hydrogen enters the reactor via opening 36, the baffles 34 circulate the hydrogen about the interior walls of the reactor to maintain the reactor temperature at about 1500° F. while the hydrogen being introduced into reactor 30 is also being heated to about 1500° F. due to the interior temperature of the reactor 30.

Opposite injector 28 is an exit port 38 for removing the heated hydrogen and reaction byproduct beryllium oxide. The chemical reaction byproduct, and hot hydrogen are conveyed by a line or conduit 40 to the filter intake port 42 of fume filter 44. A filter element 46 housed within the filter 44 serves to separate and retain the by product while releasing hot hydrogen through filter exit 48 for conveyance a long conduit 50 to a power generating device 52 which may be a gas turbine or the like.

In the zero-gravity environment of space, the beryllium powder floats as a cloud of particles inside container 14, occupying the entire volume of container 14. In this zero-gravity environment, the beryllium powder is controllably caused to flow through pipe 22 by introducing hydrogen gas into conduits 16 and 18. The hydrogen introduced through conduit 16, ejects the cloud of beryllium powder from container 14 by causing container 14 to collapse in a controlled manner. The hydrogen introduced through conduit 18 entrains beryllium powder and transports the powder through pipe 22 and conduit 25 to injector 28.

In operation, pure hot hydrogen is produced for utilization by the turbine by controllably introducing beryllium and oxygen into reactor 30 with the simultaneous introduction of hydrogen by way of opening 36. Within the reactor 30 the reactants are merged by mixing them via injector 28.

At start up, the reactants are mixed and exposed to an ignitor 32, which initiates the reaction. The ignitor may be a spark plug, a laser beam, a gas flame, a pyrogolic substance, or other types of ignitors. The reaction of beryllium and oxygen liberates heat raising the temperature of the reactor to about 6000° F. After start up, the reaction is self-sustaining without the ignitor.

During the course of the reaction within the reactor, the walls are maintained at a desired temperature level as previously indicated by the introduction of hydrogen from an external source (not shown) through opening or inlet 36.

The reaction product and hot hydrogen are then expelled from the reactor and enter the filter, which filter system retains the beryllium oxide and releases the hot hydrogen. The hot hydrogen is then transported to the turbine for the production of power for the space vehicle.

The foregoing description of the invention has been presented for purposes of illustration and description. It is intended that the scope of the invention be defined by the claims appended hereto.

What is claimed is:

1. An apparatus for generating hydrogen in vacuo comprising:

a) a housing having a collapsible container containing beryllium therein and a reactor connected there;
b) means defining a conduit communicating with the interior of said housing and said container, and an injector associated with said reactor for receiving beryllium reactant via said conduit, and oxygen reactor;
c) an ignitor positioned within the reactor proximate the injector for igniting the reactants upon introduction into the reactor;
d) baffles circumferentially positioned about interior walls of the reactor;
e) means defining an opening within the reactor for admitting hydrogen around the baffles;
f) means defining an exit port for removing reaction byproduct and hot hydrogen;
g) means defining a conduit connected to the exit port of the reactor and a filter intake of a filter;
h) a filter element housed within the filter for separation of byproduct and hot hydrogen; and
i) means defining a filter exit connected to a conduit means for transporting said hot hydrogen from said filter to a power generating device.

* * * * *